Patented Nov. 24, 1953

2,660,580

UNITED STATES PATENT OFFICE 2,660,580

REDUCTION OF QUINONE COMPOUNDS

Isaiah Von, Somerville, N. J., assignor to American Cyanamid Company, New York, N. Y., a corporation of Maine No Drawing. Application January 3, 1951, Serial No. 204,279

18 Claims. (Cl. 260—274)

This invention relates to a new method of reducing quinones and their derivatives to the corresponding leuco forms.

Esters and ethers of the leuco form of quinones and vat dyes such as the sulfuric half-esters, are products of considerable importance. Various methods are known for preparing these compounds, especially in organic solvents. In order to make use of these methods, it is generally necessary to reduce the quinone or vat dye in an organic solvent, and various techniques have been proposed for carrying out this reaction, such as the use of chlorosulfonic acid and a metal, hydrogen sulfide and an amine, or catalytic hydrogenation. However, these reduction methods each suffer from distinct drawbacks and are not of general applicability, which is not surprising in view of the wide variation of oxidation-reduction potential and other properties from one vat dye to another. Reduction with hydrogen sulfide and an amine for example, is of very limited applicability, and in many cases gives exceedingly small yield. The use of chlorosulfonic acid and a metal, while somewhat more generally applicable, is very sensitive to exact conditions of time, temperature, and solvent, which must be carefully determined for each dye. Consequently, this method is time-consuming and expensive to apply in practice. Catalytic reduction, while comparatively free from the above objection, requires elaborate and expensive apparatus, and has found very little practical use.

According to the present invention, it has been found that reduction of quinones and particularly vat dyestuffs to the leuco form can be effected simply and easily under very mild conditions by a combination of hydrogen sulfide and a metal chosen from the group consisting of copper, nickel and silver. One of the advantages of the reaction is that it is very widely applicable to a great variety of vat dyes under quite similar conditions and hence a thorough study of the best conditions for each vat dye is not necessary. The mechanism appears to be entirely different from that which occurs when hydrogen sulfide is used as a reducing agent in organic solvents in connection with an organic base as has been proposed hitherto. It is also certainly different from the reduction which occurs with copper metal in the presence of a mineral acid such as chlorosulfonic in an organic solvent as also known to the prior art. The present invention involves a completely novel mechanism in which both the metal and hydrogen sulfide take part, for neither alone will produce the desired reduction.

It is an advantage of the present invention that satisfactory operation can be obtained at room temperature. Mild heating may be employed, however, and may be useful to accelerate the reaction.

It is an advantage of the present invention that when the leuco quinone is to be transformed into another derivative such as an ether or ester, it is unnecessary to isolate the leuco quinone and on the contrary, the reaction may be effected in the same medium where reduction takes place. It is desirable to remove excess hydrogen sulfide before further reactions are effected and this can be readily carried out by blowing an inert gas such as nitrogen through the reaction medium. When the important sulfuric acid half esters of leuco vat dyes are to be prepared, the esterification reaction, which is usually effected by means of the sulfur trioxide addition compound of tertiary amines, proceeds smoothly in the organic solvent and the tertiary amine which is set free may be removed by distillation. The leuco sulfuric acid half ester can then be extracted by aqueous alkali, and, if desired as a solid product, can be isolated by conventional means such as salting.

The present invention is applicable to all quinones, simple or polycyclic, which are reducible to the leuco form. This includes all vat dyestuffs typical of which are indigoid (including the thioindigoid), acylaminoanthraquinones, anthrimides and anthrimide carbazoles, indanthrone and related azines, flavanthrone, pyranthrone, anthranthrone, dibenzpyrene quinones, anthraquinone acridones and the benzanthrone derivatives, including the dibenzanthrones.

The choice of the solvent will be determined by the characteristics of the particular quinone being reduced, it being generally desirable to choose a solvent which has solvent power for the quinone. It is also important that the solvent be inert to the reactants and to the product obtained under the condition of reaction. Reactivity in terms of addition salt formation is not an objection, however, and liquid amines constitute a class of solvent which may be employed. In such a case, however, their alkalinity plays no part in the reaction which is determined by the metal and hydrogen sulfide.

Typical solvents which may be used in the present invention are the aliphatic and aromatic hydrocarbons and their halogenated derivatives, alcohols, ethers, esters, carbonyl compounds, amides, nitriles, and tertiary amines as dimethylaniline, and heterocyclic compounds such as pyridine and the picolines.

As has been stated above, the exact mechanism of the reaction is not known. However, it seems certain that it is not the same as that where the effective reducing agent is the hydrogen sulfide, because no sulfur compounds containing sulfur in a state of oxidation higher than that of hydrogen sulfide are found in the reaction products. It seems that the hydrogen sulfide is an accessory to the metal, and finally appears in combination with the oxidized metal as a sulfide thereof.

The invention will be described in greater detail in connection with the following specific examples. The parts are by weight unless otherwise specified.

*Example 1*

Hydrogen sulfide is passed at room temperature into a mixture of 10 parts of anthraquinone and 30 parts of copper powder in 150 parts of benzene. After reduction is complete, the hydrogen sulfide is swept out with nitrogen, and the product acetylated by adding 50 parts of acetic anhydride and 30 parts of sodium acetate and heating at 70° for one-half hour. The reaction mixture is drowned in a solution of 100 parts of sodium carbonate in 1000 parts of water. The leuco anthraquinone diacetate is extracted with 800 parts of benzene and isolated by evaporation.

*Example 2*

Hydrogen sulfide gas is passed at room temperature through a mixture of 20 parts of anthraquinone and 60 parts of powdered copper in 300 parts of ethylene dichloride. Excess hydrogen sulfide is removed by the passage of gaseous hydrogen, and the reaction mixture is then extracted with a solution of 40 parts of sodium hydroxide in 1200 parts of water. To the aqueous extract is added 50 parts of benzoyl chloride. The mixture is warmed until it loses the red color characteristic of an alkaline solution of leuco anthraquinone. The solution is then diluted with 1000 parts of water, heated to the boil, and filtered. The dibenzoate of leuco anthraquinone, thus obtained, can be purified by recrystallization from a mixture of chloroform and hexane.

*Example 3*

A mixture of 10 parts of dimethoxy-dibenzanthrone and 30 parts of copper powder in 150 parts of ethylene dichloride is treated at room temperature with hydrogen sulfide gas. Excess hydrogen sulfide is then swept out with nitrogen. The resulting leuco form of the vat dyestuff is esterified by the addition of 7 parts of triethylamine and 30 parts of the addition product of triethylamine and sulfur trioxide, followed by warming at 50° C. for a short time. The resulting leuco ester is extracted with dilute aqueous sodium carbonate, from which it is salted out in the ordinary way.

*Example 4*

A mixture of 50 parts of 1-benzoylaminoanthraquinone, 150 parts of copper powder, and 750 parts of carbon tetrachloride, is reduced by the passage of hydrogen sulfide gas. After removal of excess hydrogen sulfide with nitrogen, the leuco compound is esterified by heating with 35 parts of triethylamine and 150 parts of triethylamine-sulfur trioxide addition compound. The product is extracted from the greenish brown reaction mixture with a dilute aqueous solution of 125 parts of sodium carbonate.

*Example 5*

A mixture consisting of 10 parts of alpha-chloroanthraquinone, 50 parts of "Raney nickel," and 150 parts of xylene, is treated with hydrogen sulfide gas at room temperature. When reduction is complete, the remaining hydrogen sulfide is blown out with nitrogen. The leuco anthraquinone derivative is then esterified by heating with 7 parts of triethylamine and 30 parts of triethylamine-sulfur trioxide addition product. The leuco ester is extracted with a dilute aqueous solution of 25 parts of sodium carbonate. Hydrolysis and oxidation of this solution causes regeneration of the alpha-chloroanthraquinone.

*Example 6*

A mixture of 10 parts of indigo and 30 parts of powdered copper in 150 parts of acetone is reduced by the passage of hydrogen sulfide gas at room temperature. The reaction mixture turns very dark, and the leuco indigo is esterified by heating with 7 parts of triethylamine and 30 parts of triethylamine-sulfur trioxide addition compound. The leuco ester is then extracted with aqueous sodium carbonate solution. Oxidation with nitrous acid regenerates indigo.

*Example 7*

A reaction mixture consisting of 20 parts of dibromopyranthrone, 60 parts of powdered copper, and 300 parts of bromobenzene, is reduced by the passage of hydrogen sulfide at room temperature. After removal of remaining hydrogen sulfide with nitrogen, the leuco form of the dyestuff thus obtained is esterified by heating with 14 parts of triethylamine and 60 parts of triethylamine-sulfur trioxide addition product for one-half hour. The leuco ester is extracted with a dilute aqueous solution of 25 parts of sodium carbonate. It is salted out in the usual manner.

*Example 8*

Hydrogen sulfide gas is passed into a mixture of 10 parts of the brown dyestuff of the formula

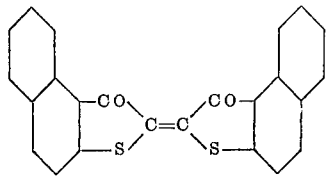

30 parts of powdered copper, and 300 parts of anisole. When reduction is complete, there is added to the blue-gray viscous reaction mixture 7 parts of triethylamine and 30 parts of triethylamine-sulfur trioxide compound. Esterification is completed in one-half hour at 50°, and the product is extracted with dilute aqueous sodium carbonate. Hydrolysis and oxidation of the leuco ester regenerates the original vat dye.

*Example 9*

A mixture of 10 parts of alpha-chloroanthraquinone, 15 parts of copper powder, and 150 parts of ethyl alcohol is treated with hydrogen sulfide. When reduction is complete, there is added 3 parts of triethylamine and 20 parts of triethylamine-sulfur trioxide compound. After gentle warming for thirty minutes, the reaction mixture is poured into a solution of 25 parts of sodium carbonate in 5000 parts of water. The aqueous extract contains the sodium salt of the leuco sulfuric ester of alpha-chloroanthraquinone.

*Example 10*

Hydrogen sulfide gas is passed into a mixture of 20 parts of the olive green dyestuff of the formula

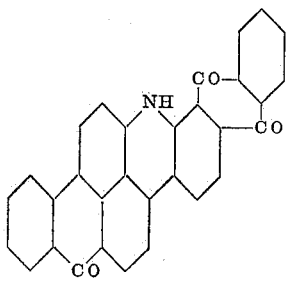

30 parts of copper powder, and 300 parts of chlorobenzene. The reaction mixture turns a very dark yellow-green. Excess hydrogen sulfide is removed in the usual manner, and the mixture is then warmed with 14 parts of triethylamine and 30 parts of triethylamine-sulfur trioxide compound. The development of a deep red color indicates the formation of the leuco sulfuric ester, which is then extracted with a dilute aqueous solution of 50 parts of sodium carbonate. It can be salted out by the usual methods.

*Example 11*

A mixture consisting of 5 parts of the vat dyestuff of Example 10, 14 parts of copper powder, and 44 parts of dimethylaniline is heated at 50° while a stream of hydrogen sulfide is passed through it. When reduction is complete, excess hydrogen sulfide is blown out with nitrogen, and 8 parts of triethylamine-sulfur trioxide compound is added. After stirring for two hours at 50°, the reaction mixture is poured into a solution of 20 parts of sodium carbonate and 400 parts of water. The dimethylaniline is removed by vacuum distillation and the mixture is filtered at 90°. Salting of the filtrate to 20 percent sodium chloride concentration gives an excellent yield of the leuco sulfuric ester of the dyestuff.

*Example 12*

Hydrogen sulfide is passed at 40° into a mixture of 12 parts of copper powder, 75 parts of dimethylaniline, and 10 parts of the brown vat dyestuff of the formula

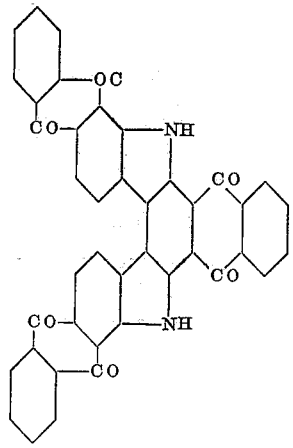

when reduction is complete, residual hydrogen sulfide is removed and the mixture is heated at 50° for one and one-half hours with 35 parts of triethylamine-sulfur trioxide addition compound. It is then drowned in a solution of 40 parts of sodium carbonate in 800 parts of water. The dimethylaniline is distilled off in vacuo and the mixture remaining is filtered at 90°. The dark brown filtrate is concentrated and salted with potassium chloride to isolate the leuco sulfuric ester of the dyestuff.

*Example 13*

A mixture of 5.9 parts of powdered copper, 35 parts of alpha-picoline, and five parts of the dyestuff of Example 12, is stirred at 75° and treated with hydrogen sulfide. With the completion of reduction, the initially red brown slurry is very dark in color. The remaining hydrogen sulfide is blown out with nitrogen, and the mixture is cooled to 50° and treated with 18 parts of triethylamine-sulfur trioxide. It quickly becomes red-brown in color, and after two hours at 50°, it is stirred at room temperature seven hours longer. It is then poured into a solution of 27 parts of sodium carbonate in 400 parts of water. The picoline is removed by vacuum distillation. The mixture is then filtered at 85°, concentrated to the volume of 200 parts of water, and salted with 50 parts of potassium chloride. The leuco sulfuric ester is obtained in excellent yield. When printed and dyed on cotton, it gives a shade of exceptional brightness and redness.

*Example 14*

Hydrogen sulfide is passed into a mixture of 5.9 parts of copper powder, 35 parts of dimethylaniline, and 5 parts of the yellow dyestuff of the formula

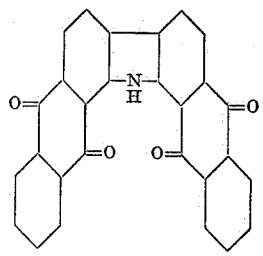

at a temperature of 40°. The mixture acquires a dark yellow-green cast. The remaining hydrogen sulfide is swept out with nitrogen, and the mixture heated to 50° with 17 parts of triethylamine-sulfur trioxide compound, whereupon it becomes much browner in color. After two hours, the mixture is drowned in a solution of 27 parts of sodium carbonate in 500 parts of water. The dimethylaniline is removed by vacuum distillation, and the mixture is filtered at 85°. The filtrate is concentrated and salted with potassium chloride to isolate the leuco sulfuric ester.

*Example 15*

Hydrogen sulfide is bubbled through a mixture of 5.9 parts of copper powder, 35 parts of dimethylaniline, and 5 parts of the yellow vat dyestuff of the formula

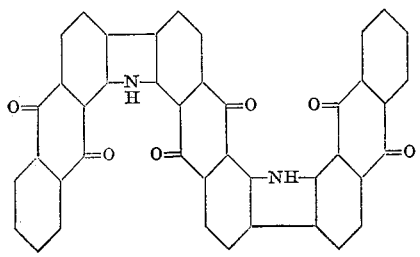

the temperature being maintained at 40°. When reduction is complete, the mixture is dark brown and thick. The remaining hydrogen sulfide is blown out with nitrogen, the temperature is increased to 50°, and 17 parts of trimethylamine-sulfur trioxide are added. The reaction mixture becomes fluid, oily, and brown in color. After two hours, it is drowned in a solution of 27 parts of sodium carbonate in 800 parts of water. The dimethylaniline is removed by vacuum distillation and the reaction mixture is heated to 90° and filtered. Salting with potassium chloride results in the crystallization of the leuco sulfuric ester of the vat dyestuff.

*Example 16*

At a temperature of 40°, hydrogen sulfide is passed through a mixture of 6.3 parts of powdered copper, 38 parts of dimethylaniline, and 7.5 parts of the vat dyestuff of the formula

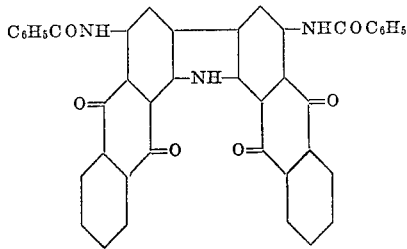

When reduction is complete, the brown reaction mixture is blown free of hydrogen sulfide, and warmed for two hours at 50° with 18 parts of triethylamine-sulfur trioxide compound. During this time the slurry turns red-brown and finally dark red. It is then poured into a solution of 26 parts of sodium carbonate and 500 parts of water. The dimethylaniline is removed by vacuum distillation and the mixture is heated to 85° and filtered. The yellow-brown filtrate is salted at 60° to a 20 percent concentration of potassium chloride, and the leuco sulfuric ester crystallizes out of solution.

*Example 17*

Hydrogen sulfide is passed at 40° into a mixture of 38 parts of dimethylaniline, 6.3 parts of copper powder, and 7.5 parts of the brown vat dyestuff of the formula

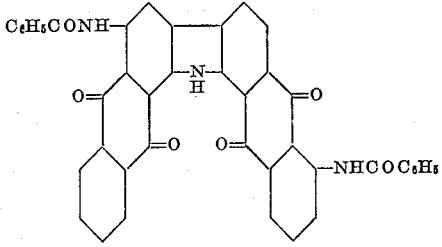

After reduction is complete, the temperature is raised to 50° while the hydrogen sulfide is swept out with nitrogen, and 18 parts of triethylamine-sulfur trioxide is added. After two hours the mixture, which is now dark red and viscous, is drowned in a solution of 42 parts of potassium carbonate in 500 parts of water. The dimethylaniline is removed by vacuum distillation and the reaction mixture is filtered at 85°. The filtrate is a dark brown solution from which the leuco sulfuric ester is salted at 90° by adding sodium chloride to a 20 percent concentration.

*Example 18*

Hydrogen sulfide gas is passed at 40° into a mixture of 150 parts of dimethylaniline, 15 parts of finely divided silver, and 10 parts of the dyestuff of Example 10. When reduction is complete, the mixture is a dark red-purple color. Excess hydrogen sulfide is blown out and the mixture is heated two hours at 50° with 15 parts of triethylamine-sulfur trioxide compound, turning red during this process. The leuco sulfuric ester is extracted from the reaction mixture with dilute aqueous sodium carbonate solution, from which it is salted out in the usual way.

*Example 19*

Hydrogen sulfide gas is passed into a mixture of 10 parts of alpha-chloroanthraquinone, 15 parts of copper powder, and 150 parts of xylene, the temperature being maintained at 40–50°. The reaction mixture turns dark brown and is then freed of hydrogen sulfide by passing in nitrogen. Esterification is then carried out in the usual way with 3 parts of triethylamine and 20 parts of triethylamine-sulfur trioxide compound. The reaction mixture is drowned in a solution of 3000 parts of water and 200 parts of 10 percent sodium carbonate solution. The desired leuco ester is found in the aqueous solution.

*Example 20*

Similar results are obtained if in the above example the xylene is replaced by an equal weight of diethyl ether, the temperature of reduction being maintained at 26–28°.

*Example 21*

Hydrogen sulfide is passed into a reaction mixture consisting of 10 parts of alpha-chloroanthraquinone, 15 parts of copper powder, and 150 parts of ethyl acetate. The mixture rapidly turns brown, and is freed of residual hydrogen sulfide by passing in nitrogen. Esterification of the leuco compound is carried out in the usual way by warming with 3 parts of triethylamine and 20 parts of the addition compound of triethylamine and sulfur trioxide. Extraction of the mixture with an aqueous solution of 20 parts of sodium carbonate gives a solution of the disulfuric ester of leuco alpha-chloroanthraquinone, from which the starting material can be recovered by hydrolysis and oxidation with nitrous acid.

*Example 22*

Into a reaction mixture consisting of 11.3 parts of powdered copper, 110 parts of ethylene dichloride, and 10 parts of the dyestuff of Example 10, hydrogen sulfide is passed at room temperature. The mixture darkens and rises in temperature somewhat. When reduction is complete the hydrogen sulfide remaining is blown out with nitrogen, and 45 parts of triethylamine and 16 parts of triethylamine-sulfur trioxide compound are added. The mixture is heated one and one-half hours at 40–50° C., and then drowned in a dilute aqueous solution of 35 parts of sodium carbonate. Working up in the usual manner gives an excellent yield of the leuco sulfuric ester.

*Example 23*

A mixture of 75 parts of alpha-picoline and 11.5 parts of chlorosulfonic acid is cooled to below 15° C. and treated with 16 parts of copper powder and 11 parts of the dyestuff of Example 10. This is followed by the passage of hydrogen sulfide into the mixture, resulting in immediate formation of a red color. When reduction is complete, residual hydrogen sulfide is blown out of the solution and the product is isolated by extraction with dilute sodium hydroxide solution.

*Example 24*

A mixture of 5 parts of the dyestuff of Example 10, 14 parts of powdered copper, and 44 parts of dimethylaniline is treated with hydrogen sulfide at a temperature of 50° C. Excess hydrogen sulfide is then removed, and the mixture treated with 9 parts of the sulfur trioxide compound of N-ethylmorpholine. The reaction is completed at 50°. The reaction mixture is then poured into a solution of 20 parts of sodium carbonate in 400 parts of water, vacuum distilled to remove the amines, and then filtered. The leuco sulfuric ester is isolated by salting.

*Example 25*

A mixture of 6 parts of powdered copper, 25 parts of alpha-picoline, and 5 parts of the dyestuff of Example 12 is stirred at 75° while being treated with hydrogen sulfide. When reduction is complete, residual hydrogen sulfide is blown out with nitrogen. There is then added a mixture of 11.6 parts of chlorosulfonic acid and 70 parts of alpha-picoline. The reaction is completed by stirring for three hours at 50°. After drowning in sodium carbonate solution and distillation of the picoline, the product is isolated in the usual way.

I claim:

1. A process of reducing a quinone by treating it in an organic solvent with hydrogen sulfide and a metal chosen from the group consisting of nickel, copper and silver, the amount of the metal being sufficient to effect substantial reduction of the quinone.

2. A process according to claim 1 in which the metal is copper.

3. A process of reducing a polycyclic quinone by treating it in an organic solvent with hydrogen sulfide and a metal chosen from the group consisting of nickel, copper and silver.

4. A process according to claim 3 in which the polycyclic quinone contains an anthraquinone nucleus.

5. A process according to claim 1 in which the leuco quinone obtained is reacted without isolation with a sulfur trioxide addition product of a tertiary amine to convert it to its sulfuric acid half-ester.

6. A process according to claim 5 in which the quinone is 1-benzoylaminoanthraquinone.

7. A process according to claim 3 in which the metal is copper, the reaction is carried out in an inert organic solvent, and the polycyclic quinone is an indigoid dyestuff.

8. A process according to claim 7 in which the leuco vat dyestuff obtained is reacted without isolation with a sulfur trioxide addition product of a tertiary amine to convert it to its sulfuric acid half-ester.

9. A process according to claim 8 in which the indigoid dyestuff has the formula

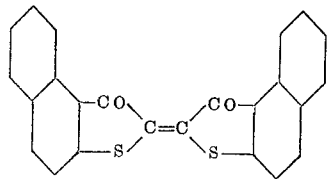

10. A process according to claim 3 in which the metal is copper, the reaction is carried out in an inert organic solvent for the quinone, and the polycyclic quinone contains a benzanthrone nucleus.

11. A process according to claim 10 in which the leuco vat dyestuff obtained is reacted without isolation with a sulfur trioxide addition product of a tertiary amine to convert it to its sulfuric acid half ester.

12. A process according to claim 11 in which the polycyclic quinone has the formula

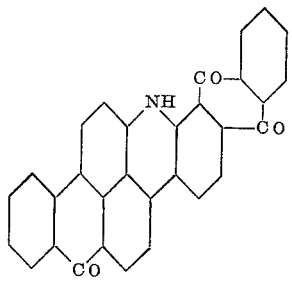

13. A process according to claim 3 in which the metal is copper, the reaction is carried out in an inert organic solvent for the quinone, and the polycyclic quinone is a dyestuff of the pyranthrone series.

14. A process according to claim 13 in which the leuco vat dyestuff obtained is reacted without isolation with a sulfur trioxide addition product of a tertiary amine to convert it to its sulfuric acid half ester.

15. A process according to claim 14 in which the polycyclic quinone is dibromopyranthrone.

16. A process according to claim 3 in which the metal is copper, the reaction is carried out in an inert organic solvent for the quinone, and the polycyclic quinone contains a carbazole nucleus.

17. A process according to claim 16 in which the leuco vat dyestuff obtained is reacted without isolation with a sulfur trioxide addition product of a tertiary amine to convert it to its sulfuric acid half ester.

18. A process according to claim 17 in which the polycyclic quinone has the formula
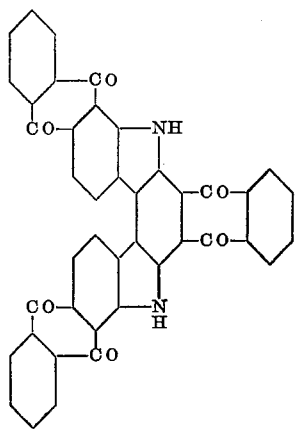
ISAIAH VON.
References Cited in the file of this patent
UNITED STATES PATENTS
| Number | Name | Date |
|---|---|---|
| 1,810,758 | Dreschen et al. | Jan. 16, 1931 |
| 1,826,811 | Muench | Oct. 13, 1931 |
| 1,879,028 | Bauer et al. | Sept. 27, 1932 |
| 2,035,362 | Bauer et al. | Mar. 24, 1936 |
| 2,403,226 | Lecher et al. | July 2, 1946 |
OTHER REFERENCES
Schmidt et al., Ber. Deut. Chem., vol. 35, pp. 3123–4 (1902).